United States Patent [19]

Maegawa

[11] Patent Number: 5,758,086
[45] Date of Patent: May 26, 1998

[54] DATA PROCESSING SYSTEM AND DATA PROCESSING METHOD

[75] Inventor: Hirotoshi Maegawa, Tokyo, Japan

[73] Assignee: Digital Vision Laboratories Corporation, Tokyo, Japan

[21] Appl. No.: 811,393

[22] Filed: Mar. 4, 1997

[30] Foreign Application Priority Data

Mar. 5, 1996 [JP] Japan .................................... 8-047832

[51] Int. Cl.⁶ .................................................. G06F 9/00
[52] U.S. Cl. .................................................... 395/200.61
[58] Field of Search ........................... 395/200.33, 200.61

[56] References Cited

U.S. PATENT DOCUMENTS

| | | | |
|---|---|---|---|
| 5,586,264 | 12/1996 | Belknap et al. | 395/200.49 |
| 5,603,058 | 2/1997 | Belknap et al. | 395/855 |
| 5,630,067 | 5/1997 | Kindell et al. | 395/200.61 |
| 5,649,101 | 7/1997 | Mathewson, II | 395/200.75 |
| 5,666,487 | 9/1997 | Goodman et al. | 395/200.76 |

*Primary Examiner*—Krisna Lim
*Attorney, Agent, or Firm*—Knobbe, Martens, Olson & Bear, LLP

[57] ABSTRACT

A data processing system that has a data processing unit for performing desired processing with respect to a stream of data such as video data and/or audio data, a data providing unit having stream data which becomes the object of that processing and for providing the data in accordance with a request, and a delivering unit for delivering the provided stream data to the data processing unit. The units are constituted on any one or more of the nodes on the network. Further, a data processing method for performing desired processing with respect to stream data existing on any node on the network, wherein a managing unit for managing the stream data is generated on any node on the network in accordance with a request from the data processing unit, the managing unit generates a transmitting unit for obtaining the stream data and transmitting the same with the predetermined transfer format on the node having the stream data, the managing unit generates a receiving unit for receiving the transmitted data on the node for performing the desired processing with respect to the stream data thereof, and the desired part of the stream data is transferred with the desired format via the transmitting unit and the receiving unit based on the control of the managing unit, that transferred data is restored and provided to the data processing unit, and the desired processing is carried out.

13 Claims, 17 Drawing Sheets

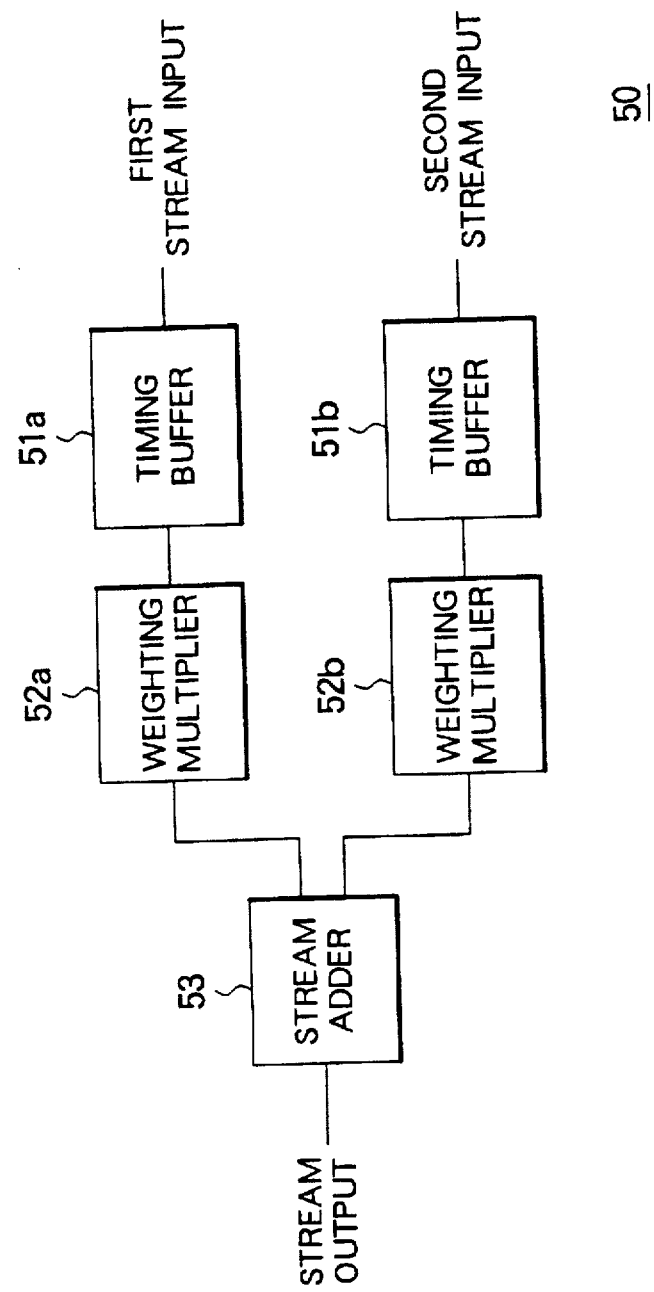

DATA PROCESSING SYSTEM AND DATA PROCESSING METHOD

BACKGROUND OF THE INVENTION

1. Field of the Invention

The present invention relates to a data processing system for performing desired processing with respect to continuous data such as audio data and video data by a plurality of data processing apparatuses connected on for example a network and to a data processing method for the same.

2. Description of the Related Art

Along with the development of data processing technology and communications technology, networks are being constructed comprised of various different types of data processing apparatuses connected together. Such a network environment promises to enable distributed processing in which information and computation resources are dynamically arranged to enable processing of data with a high efficiency.

On the other hand, along with the advances made in signal processing technology, audio data and video data are now frequently being subjected to sophisticated signal processing and transmitted over such networks. The so-called multimedia processing can be said to be processing which links such audio data and video data to perform new types of data processing.

It would seem that when such multimedia processing is applied to the distributed processing environment on the network mentioned above, the multimedia processing can function more efficiently and can be used in many types of usages. Then, it is desired to realize such multimedia processing in the environment appropriately. In general, however, when it is intended to perform desired processing by utilizing continuous data such as audio data and video data under a network environment, the method of control and the processing routine for the same become very complex.

For example, when it is desired to perform processing on such audio data and video data via a network, it is necessary to control the system so that the data processing apparatus having the data processing module and the data processing apparatus having the AV (audio and/or video) data to be processed communicate with each other, secure a transmission route, synchronize operations, and carry out the transmission based on the desired format. Further, it also becomes necessary to finely control the transmission to perform control such as the stoppage of the stream, rewind, or fast forward.

However, in order to perform such processing, that is, processing with which the synchronization and continuity of the obtained data are secured while considering the asynchronization at the time of transmission based on the communication protocol, complex and sophisticated control is required at the system level.

Accordingly, it is very difficult to perform processing from the application level in a distributed processing environment via such a network which enables its full benefits to be enjoyed. On top of this, the complexity of such a processing configuration and the troublesomeness of the routine when it is to be executed become obstacles to realizing sophisticated multimedia processing via a network as mentioned before.

In order to deal with these problems, a methodology in which the mechanisms of such communication are managed and controlled all together has been proposed. For example, the Interactive Multimedia Association (IMA) proposed a specific relationship between such framework objects and application programs (clients) in "Draft Recommended Practice, Multimedia Systems Services (MSS)", first edition, May 1995. In this MSS, a device having a stream, a transmitting means, a receiving means, a format managing means, a stream managing means, etc. are formed into modules to simplify and enable easy control of the interface with the clients (applications).

In this configuration, however, since device-drivers are formed into modules directly, depending on the device-drivers, limits in the relationships with the clients and source stream data on the network arises and there is the problem that it is hard to configure the optimum processing environment on the network. Namely, when considering the arrangement of the functions on the network, there is no flexibility and no adaptability either. Therefore, the demand that various objects be dynamically arranged on the network without depending upon the device having the client or the device having the stream data and that therefore a distributed processing environment be constructed with a high efficiency has not been satisfactorily met.

SUMMARY OF THE INVENTION

An object of the present invention is to provide a data processing system with which sophisticated multimedia processing can be realized via a network without the complexity and troublesomeness of the processing in an application layer as mentioned before by providing an application programming interface for performing processing and control with a high efficiency under a network environment with respect to time series continuous data such as video data and audio data.

Further, another object of the present invention is to provide such a data processing method.

For these purposes, in the present invention, when continuous data such as audio data and video data are transmitted, the transmission module and reception module are virtually handled as a single stream of data and, as a function on the application programming, the control of the transmission of the data can be carried out with respect to that virtual stream.

BRIEF DESCRIPTION OF THE DRAWINGS

These and other objects and features of the present invention will become more apparent by the following description of the preferred embodiments made with reference to the attached drawings, wherein:

FIG. 14 is a view of the structure of a stream synthesizing unit of the data processing system shown in FIG. 13A and FIG. 13B;

DESCRIPTION OF THE PREFERRED EMBODIMENTS

An embodiment of the present invention will be explained next by referring to FIG. 1 to FIG. 17.

Figure 1:
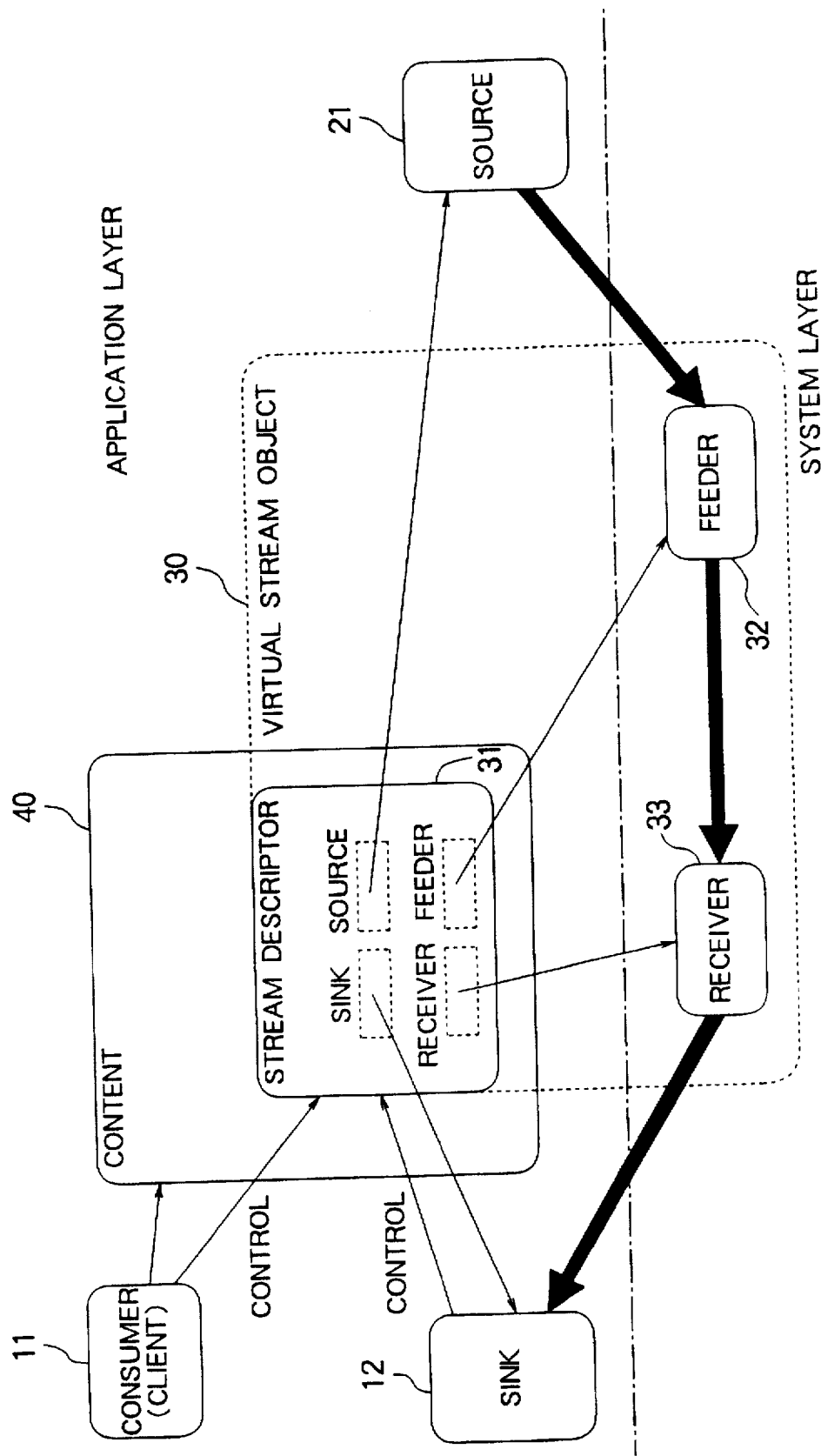
FIG. 1 is a view explaining a data processing system of the present invention.

FIG. 1 is a view explaining the data processing method of the present invention;

FIG. 1 is a view of a state where a client application 11 uses stream data fed from a source feeding module 21 via a virtual stream object 30. The content of the stream data is transferred from the source feeding module 21 to a sink module 12 after passing through a complicated routine at the system level. A state where the data can be handled as if it were a single stream object 30 from the client application 11 is shown.

Figure 2:
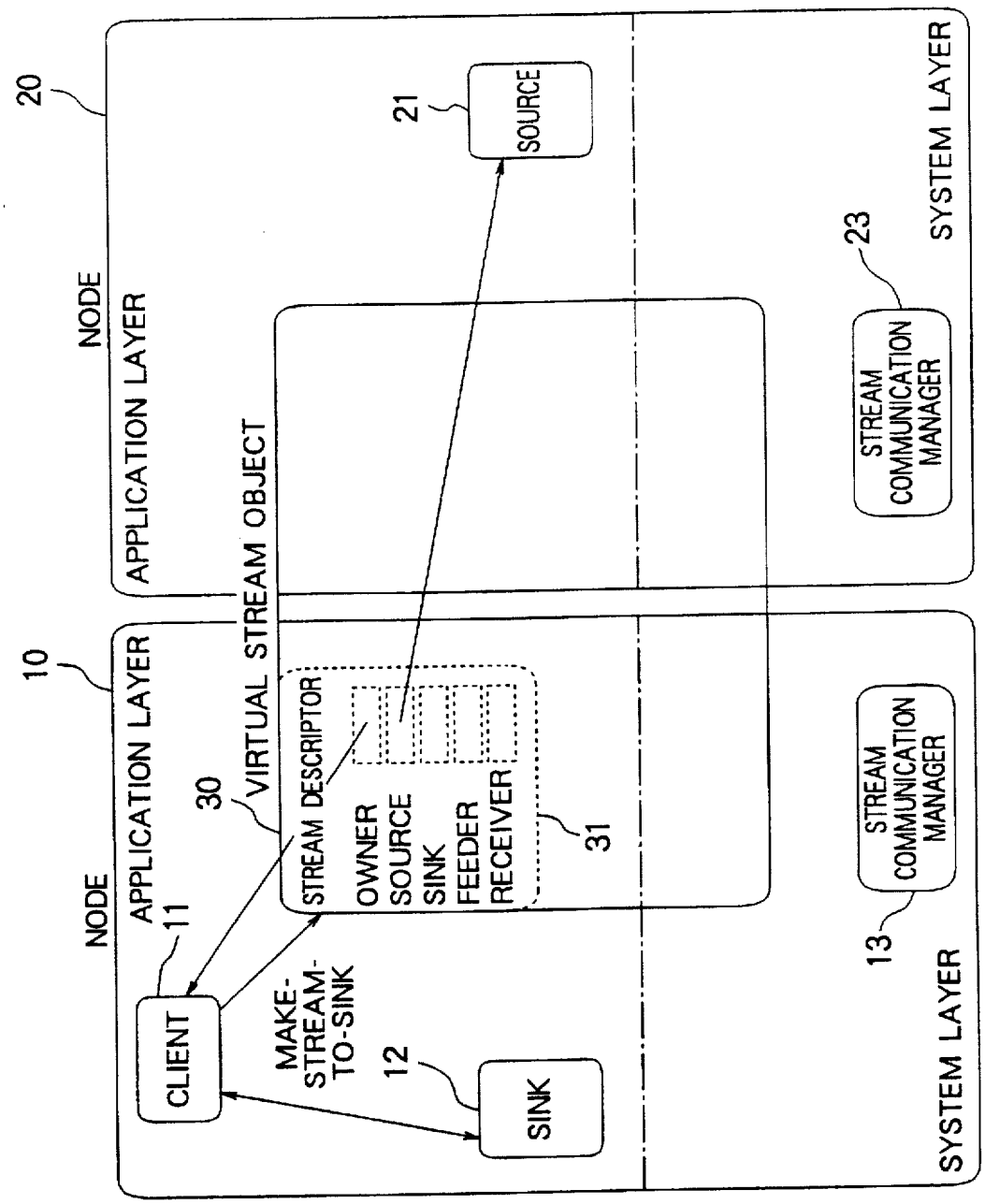
FIG. 2 is a view of a state where a virtual stream object is generated.
Figure 3:
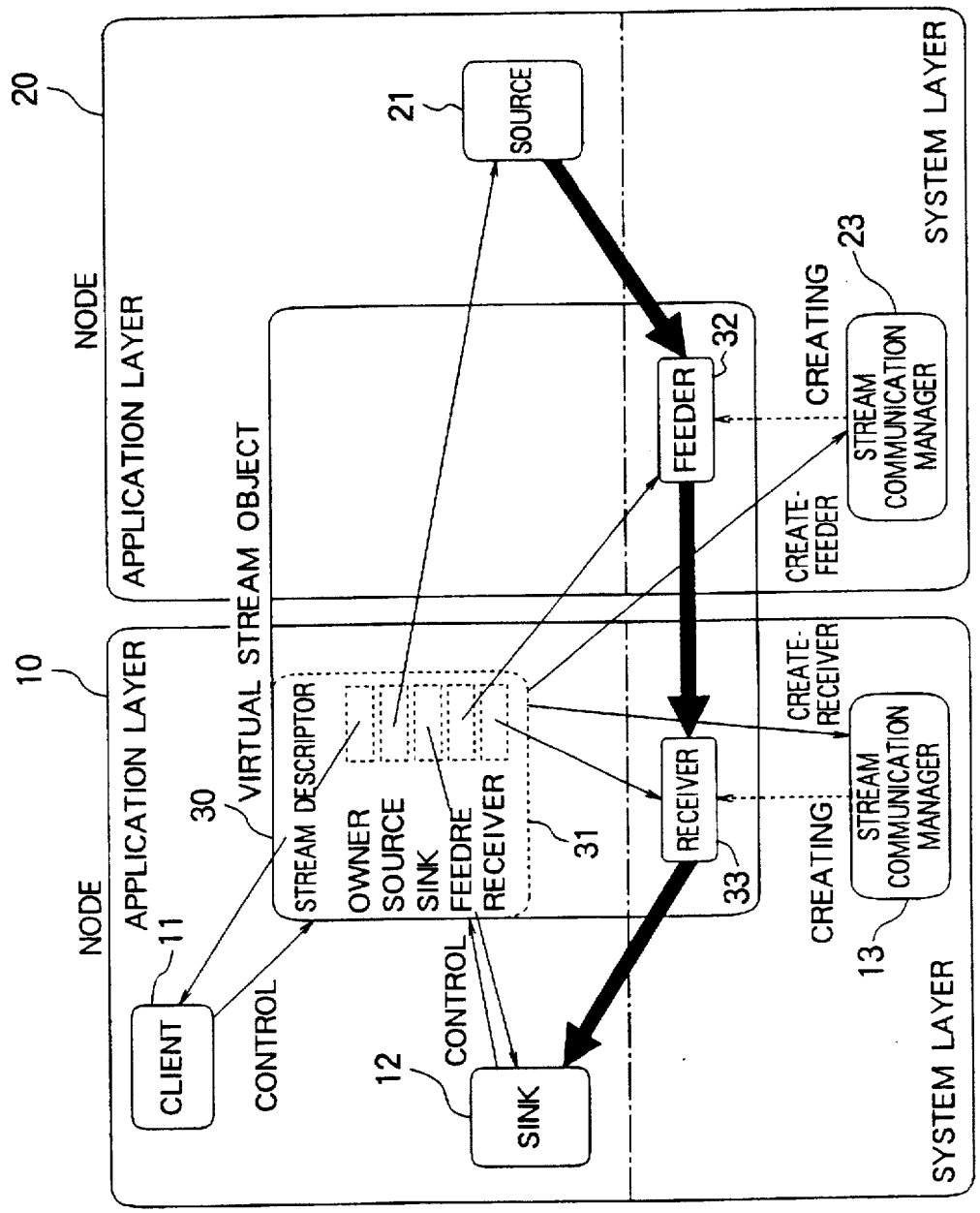
FIG. 3 is a view of a state when the transfer of the stream data is actually carried out.

FIG. 2 and FIG. 3 are views explaining the data processing method in an actual data processing mechanism, in which FIG. 2 is a view of a state where the virtual stream object 30 is generated; and FIG. 3 is a view of a state where the transfer of the stream data is actually carried out.

Below, an explanation will be made of the present embodiment by explaining the functions of the modules shown in FIG. 1 to FIG. 3 and, at the same time, explaining the operation in each module at the time of the actual data processing.

First, an explanation will be made of the modules.

The client application 11 is an application module which uses continuous data such as video data and audio data (hereinafter also referred to as the stream data or, simply, stream).

A content script 40 is data for generating a virtual stream object 30 of a multimedia data structures in an application layer. Contents of the content script 40 are shown in FIG. 4 and states of generating the multimedia structure from the content script 40 are shown in FIG. 5.

Figure 4:
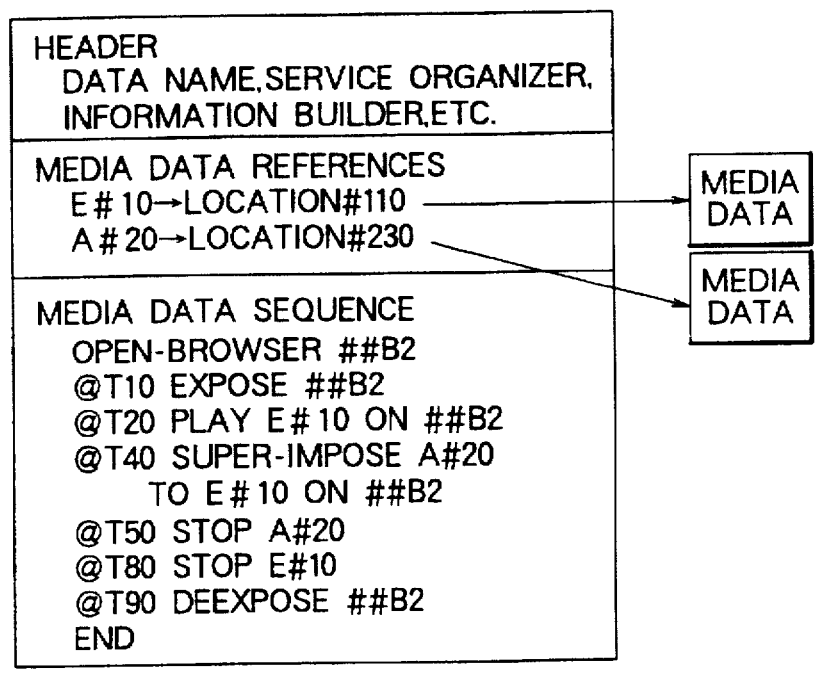
FIG. 4 is a view of contents of content script for generating a virtual stream object.
Figure 5:
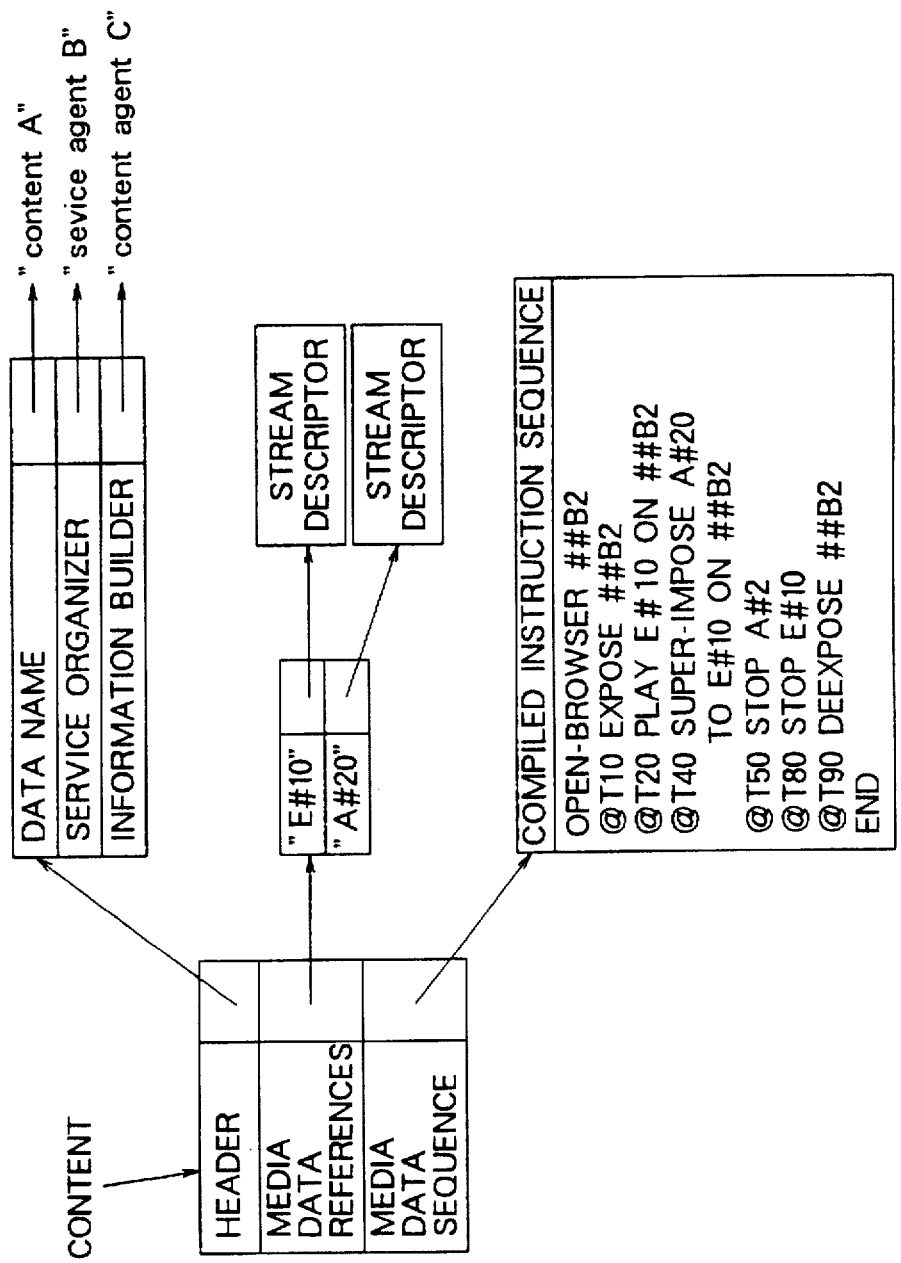
FIG. 5 is a view of a state when the virtual stream object is generated based on the content script shown in FIG. 4.

As shown in FIG. 4, the content script 40 is comprised of a header portion, a media data reference portion, and a media data sequence portion. As shown in FIG. 5, the header portion stores data which identifies the data stream structure, the media data reference portion stores the reference information of the source media data, and the media data sequence portion stores instructions performed on the media data.

The virtual stream object 30 is a module for handling stream data that is stored in the source feeding module 21. A complex routine of the system level is necessary for using this as if it were only a stream of mere materials.

The virtual stream object 30 comprises a stream descriptor module 31, a feeder module 32, and a receiver module 33.

The stream descriptor module 31 is a module for interfacing with the client application 11 and modules of the system level and, at the same time, controlling the modules of the system level to make them perform a desired operation with respect to the stream data. With respect to the stream descriptor module 31, a variable owner indicating the client application 11 which is the master module, a variable source indicating the stream data as the object of the processing, a variable sink designating the sink module 12 receiving the stream data, a variable feeder indicating the transmission module of the stream, and a variable receiver indicating the reception module of the stream are defined as the instance variables.

The feeder module 32 is a module which is generated according to need for reading the stream data from the source module of the stream data in accordance with the request of the receiver module 33 mentioned later and outputting the same to the receiver module 33 according to a predetermined protocol.

The receiver module 33 is generated according to need, outputs a transmission request of the stream data to the receiver module 33 under the control of the stream descriptor module 31 and, at the same time, outputs the transmitted stream data to the sink module 12 which can be controlled by the client application 11.

Note that, the protocol between the feeder module 32 and the receiver module 33 is XTP. Then, this XTP is used to deal with the transmission skew caused by the confusion of the network and to deal with the time lag caused by the difference of the clocks used by the feeder module 32 and the receiver module 33 for working.

A stream communication manager 13 and a stream communication manager 23 shown in FIG. 2 and FIG. 3 are processing modules for generating the feeder module 32 and receiver module 33 according to need and permanently exist in the system.

The source feeding module 21 is a module existing in the device storing the stream data for feeding the stream data, and the sink module 12 is a module for receiving that stream data and providing this to the client application 11.

In a data processing system of such a modular configuration, the virtual stream object 30 is generated as shown in FIG. 2 by merely designating the source stream data from the client application 11. By performing the processing by using this as the stream data after this, a desired processing can be carried out. At this data processing, as shown in FIG. 3, the modules control the transfer of the stream data etc. in association, but the processing may of course be carried out by the client application 11 with respect to the virtual stream object 30.

Next, an explanation will be made of the flow of the routine and the operations in the modules when the actual data processing is carried out in such a data processing system by referring to FIG. 6 to FIG. 10.

Figure 6:
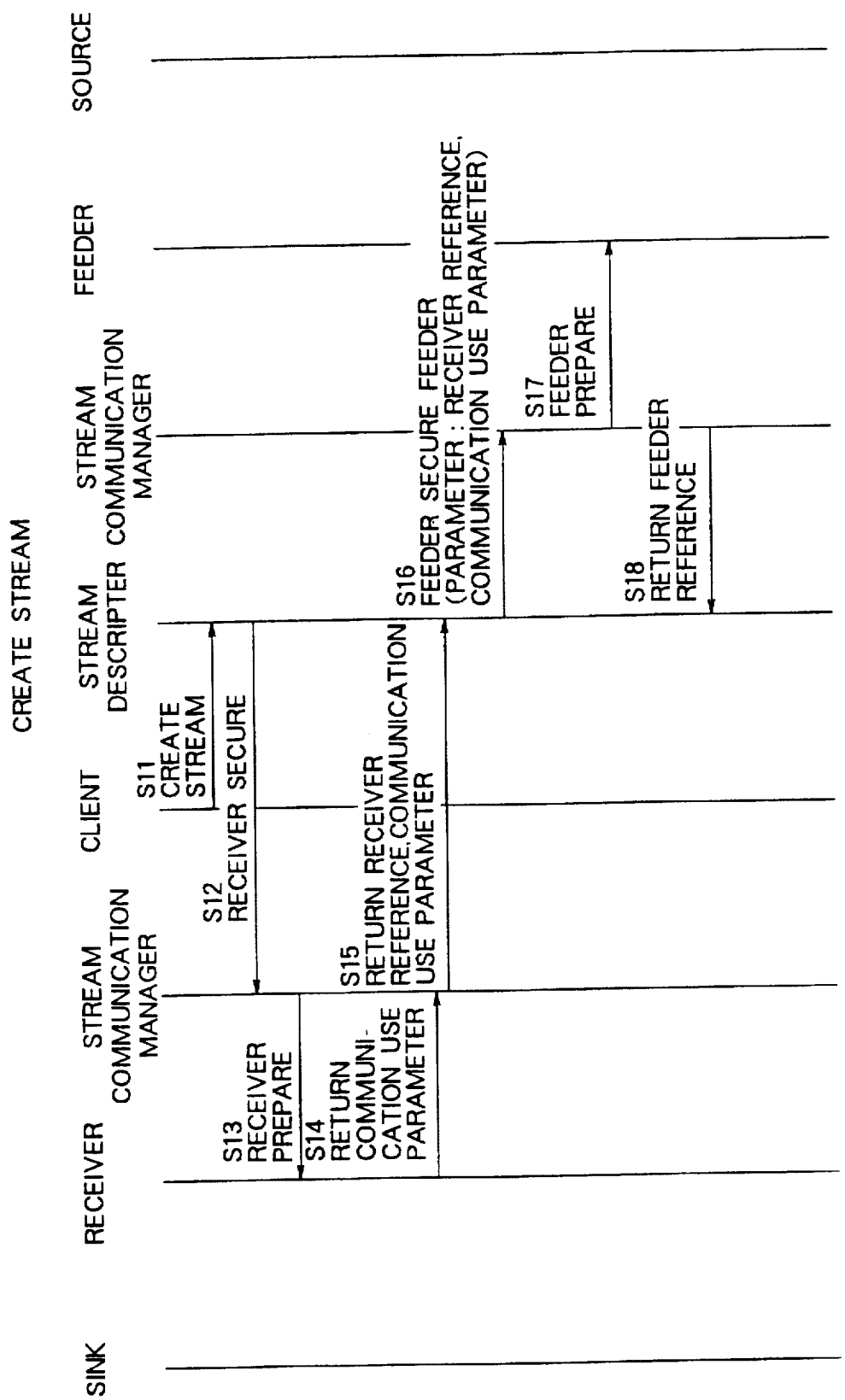
FIG. 6 is a view explaining the operations of the modules when the virtual stream object is generated in the data processing system shown in FIG. 1.

First, an explanation will be made of the operation for generating the virtual stream object by referring to FIG. 6.

First, a stream descriptor module 31 is generated in the data processing apparatus 10 based on for example the data source described in a content script 40 received by the client application 11.

Then, the client application 11 on the data processing apparatus 10 calls up a method "create stream" at the stream descriptor module 31 and requests the generation of the stream communication mechanism shown in FIG. 3 (step S11). Then, the stream descriptor module 31 requests the securing of a receiver module 33 at the stream communication manager 13 (step S12), and the stream communication manager 13 generates the receiver module 33 in accordance with this (step S13). The generated receiver module 33 returns communication parameters such as the direction data for the feeder module 32 as a return value (step S14), and the stream communication manager 13 further adds the reference of the receiver module 33 and returns the return value to the stream descriptor module 31 (step S15).

When the generation of the receiver module 33 is ended, the stream descriptor module 31 transmits the reference and communication parameters of the receiver module 33 to the data processing apparatus 20 and instructs the generation of the feeder module 32 to the stream communication manager 23 of the data processing apparatus 20 (step S16). The stream communication manager 23 generates the feeder module 32 in accordance with this (step S17). Then, the stream communication manager 23 returns the reference of the feeder module 32 to the stream descriptor module 31 (step S18).

By such processing, the virtual stream object 30 containing the stream descriptor module 31, the feeder module 32, and the receiver module 33 is generated.

Figure 7:
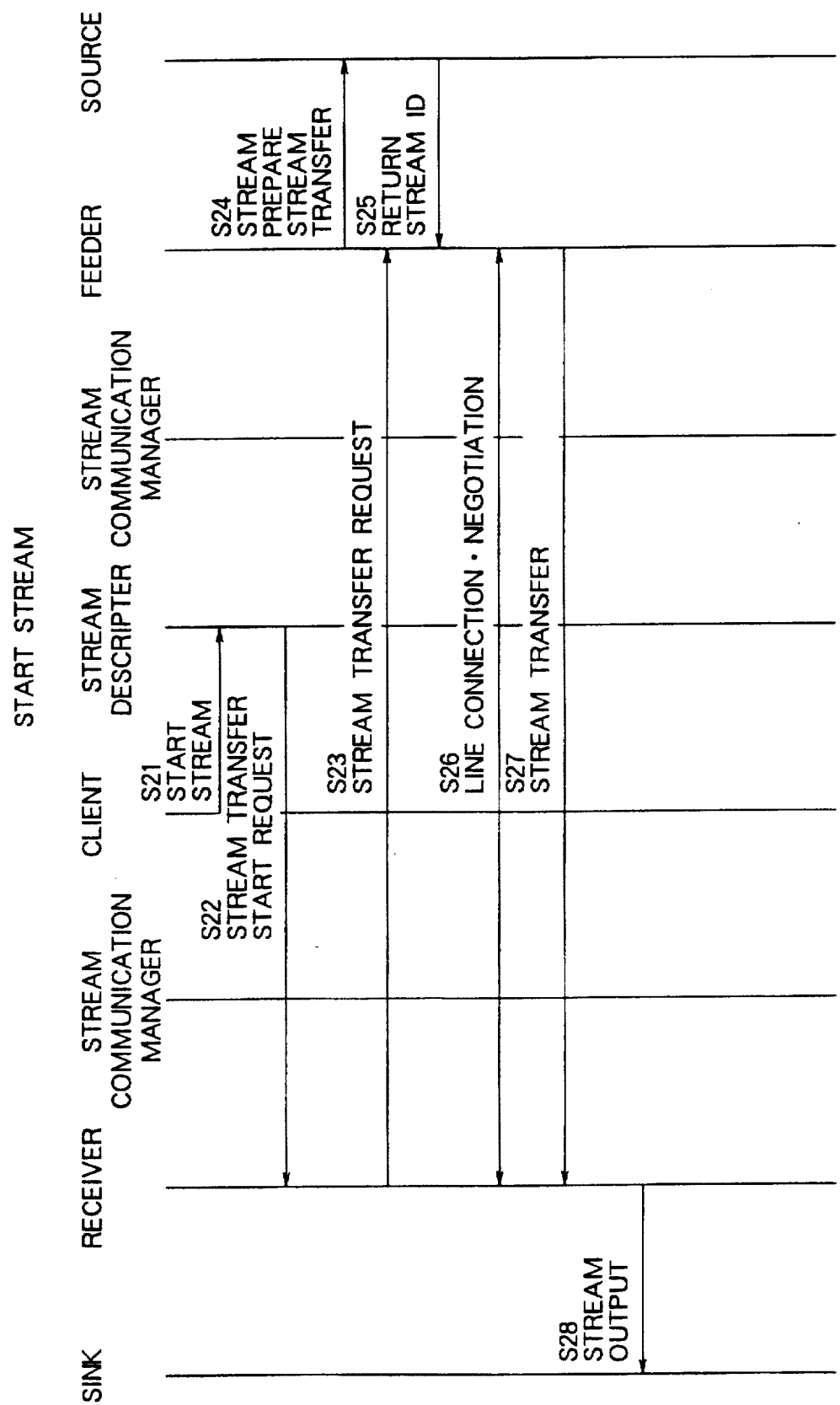
FIG. 7 is a view explaining the operations of the modules when the transfer of the stream is started in the data processing system shown in FIG. 1.

Next, an explanation will be made of the operation for performing the transfer of the stream by the virtual stream object by referring to FIG. 7.

First, the client application 11 on the data processing apparatus 10 requests a method "start stream" at the stream descriptor module 31 (step S21), and the stream descriptor module 31 requests the start of the transfer at the receiver module 33 (step S22). Then, the receiver module 33 requests the transfer of the stream at the feeder module 32 of the data processing apparatus 20 (step S23), and further the feeder module 32 requests the transfer of the stream to a source feeding module 21 in the data processing apparatus 20 (step S24).

The source feeding module 21 returns the stream ID and, at the same time, successively outputs the stream to the feeder module 32 in accordance with the request (step S25). Then, the feeder module 32 and the receiver module 33 secure the transmission line in association (step S26) and transfer the stream output from the source feeding module 21 from the feeder module 32 to the receiver module 33 (step S27). The receiver module 33 successively outputs the received stream to the sink module 12 (step S28).

Thereafter, the stream is successively transferred via the secured route.

Note that, the request to start the stream may be also made during a period when the stream descriptor module 31 is performing processing to create a stream. In this case, the stream descriptor module 31 immediately starts the processing to start the stream after the end of the processing to create the stream.

Figure 8:
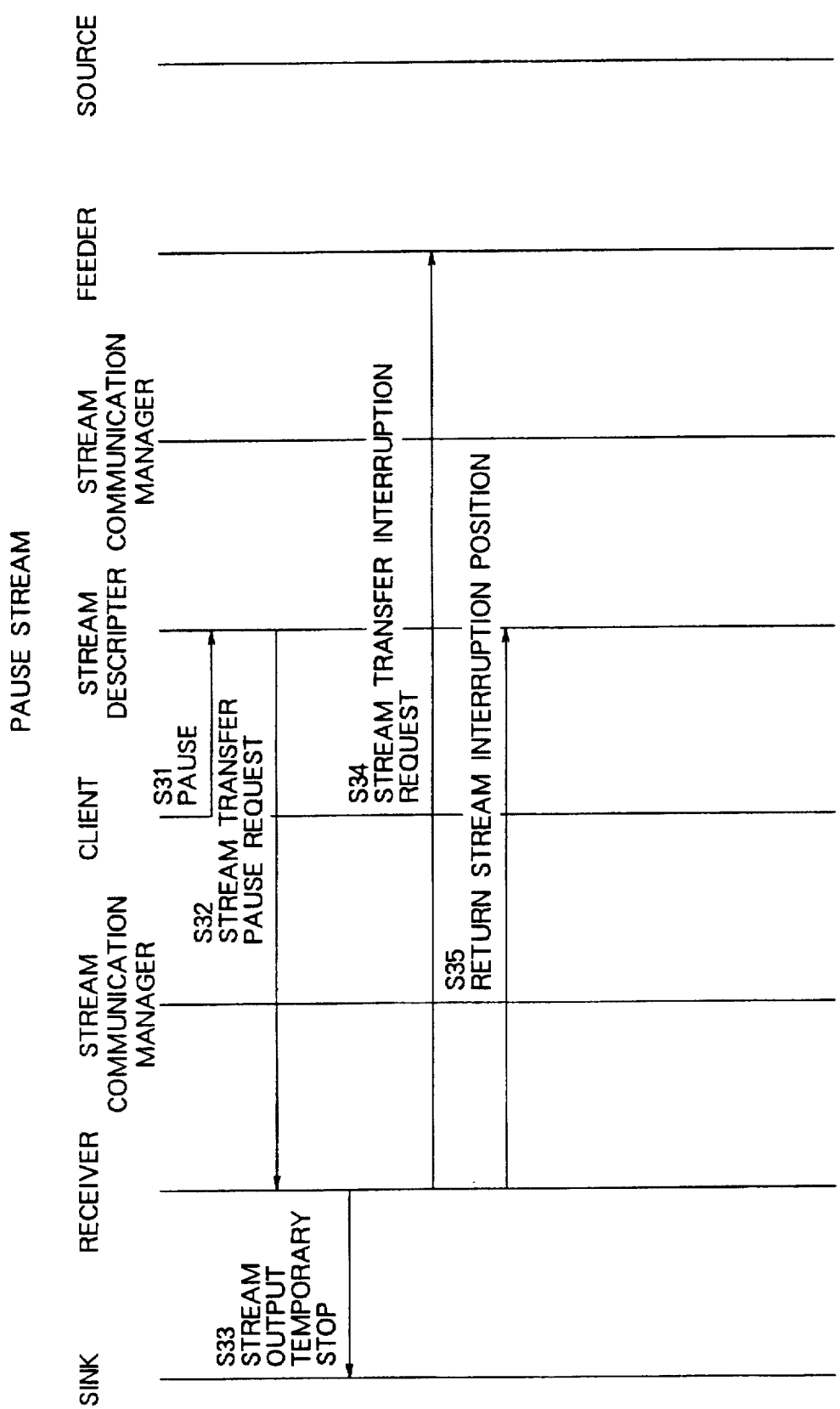
FIG. 8 is a view explaining the operations of the modules when the transfer of the stream is stopped in the data processing system shown in FIG. 1.

Next, an explanation will be made of the operation of temporarily stopping the transfer of the stream by referring to FIG. 8.

First, the client application 11 on the data processing apparatus 10 calls up a method "pause" (step S31), whereby the stream descriptor module 31 requests an interruption of the transfer of the stream (step S32). The receiver module 33 first temporarily stops the output of the stream to the sink module 12 (step S33), and further requests the interruption of transfer of the stream at the feeder module 32 of the data processing apparatus 20 (step S34) and, at the same time, returns the data of the interruption position of the stream to the stream descriptor module 31 (step S35).

Next, an explanation will be made of the operation for restarting the transfer of the paused stream.

Figure 9:
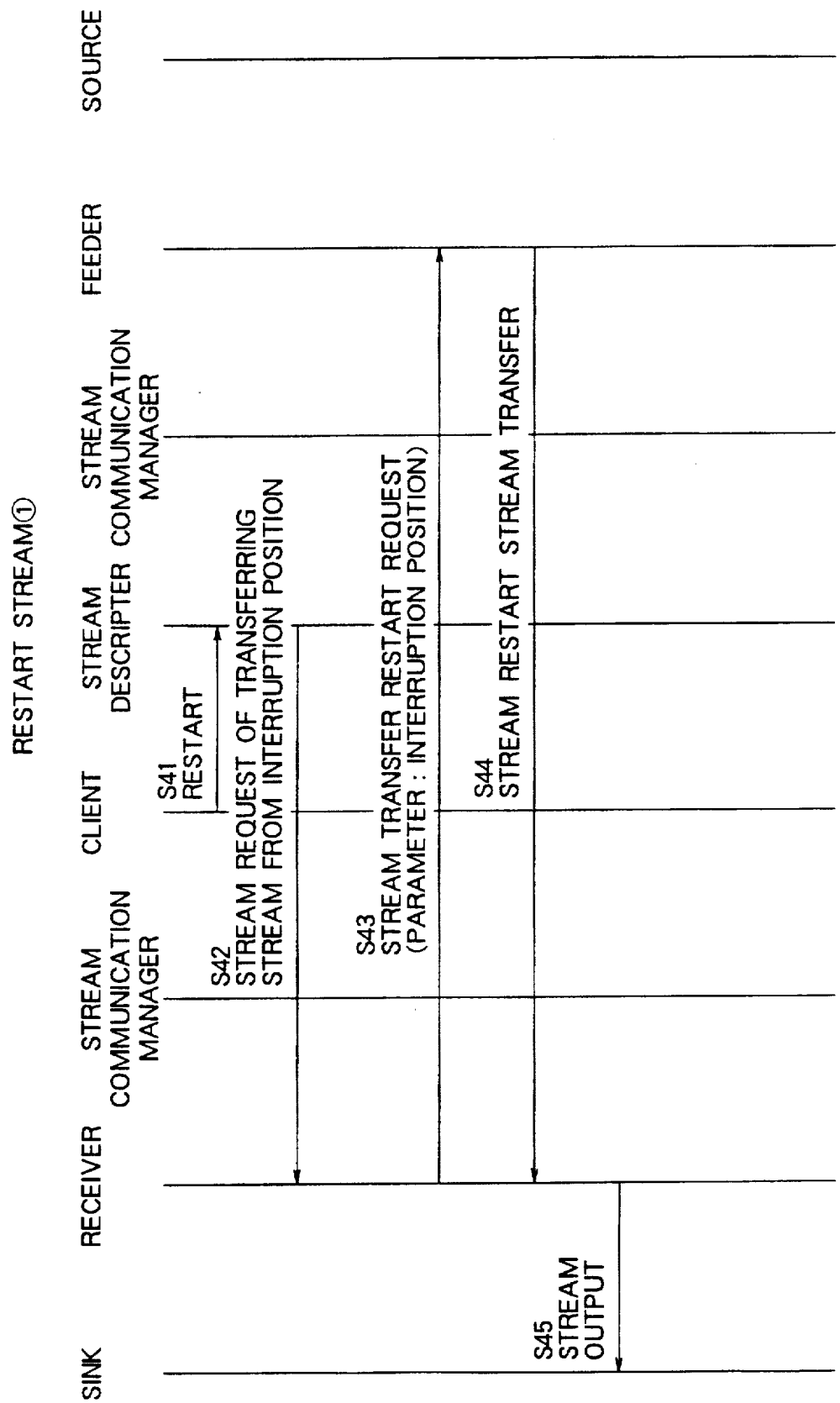
FIG. 9 is a view explaining the operations of the modules when the transfer of the stream is restarted in the data processing system shown in FIG. 1.

First, referring to FIG. 9, an explanation will be made of the operation to restart the transfer where the communication protocol is XTP and the control protocol between the feeder module 32 and the receiver module 33 is used.

First, the client application 11 calls up a method "restart" (step S41), whereby the stream descriptor module 31 requests restart of the transfer of the stream to the receiver module 33 (step S42). The receiver module 33 sends the interruption position at the pause to the feeder module 32 of the data processing apparatus 20 as a parameter and requests the transfer of the stream (step S43). By this, the feeder module 32 reads the stream from the source feeding module 21 and restarts the transfer with respect to the receiver module 33 (step S44). The stream received at the receiver module 33 is successively output to the sink module 12 (step S45).

Figure 10:
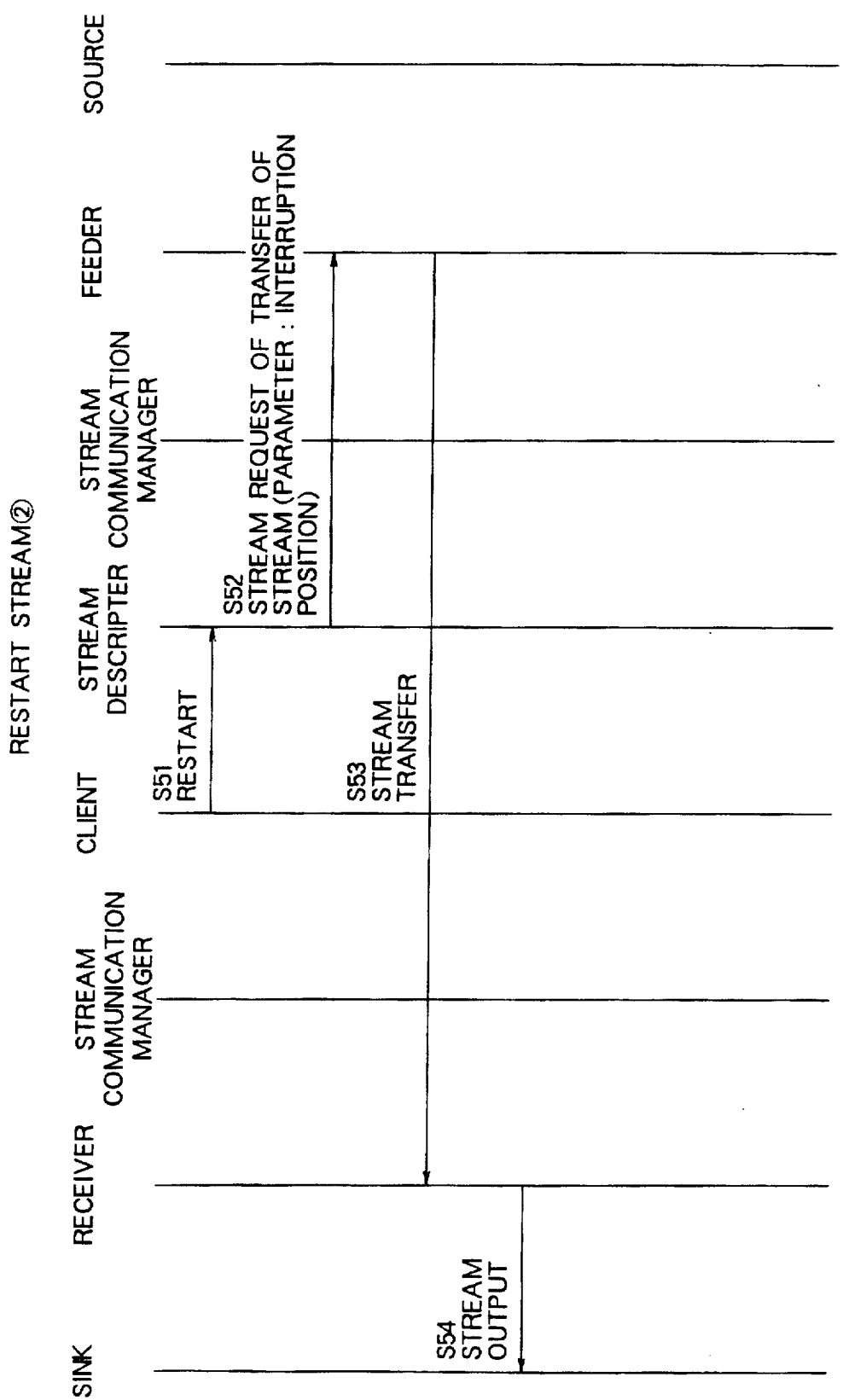
FIG. 10 is a view explaining the operations of the modules when the transfer of the stream is restarted in the data processing system shown in FIG. 1.
Figure 11:
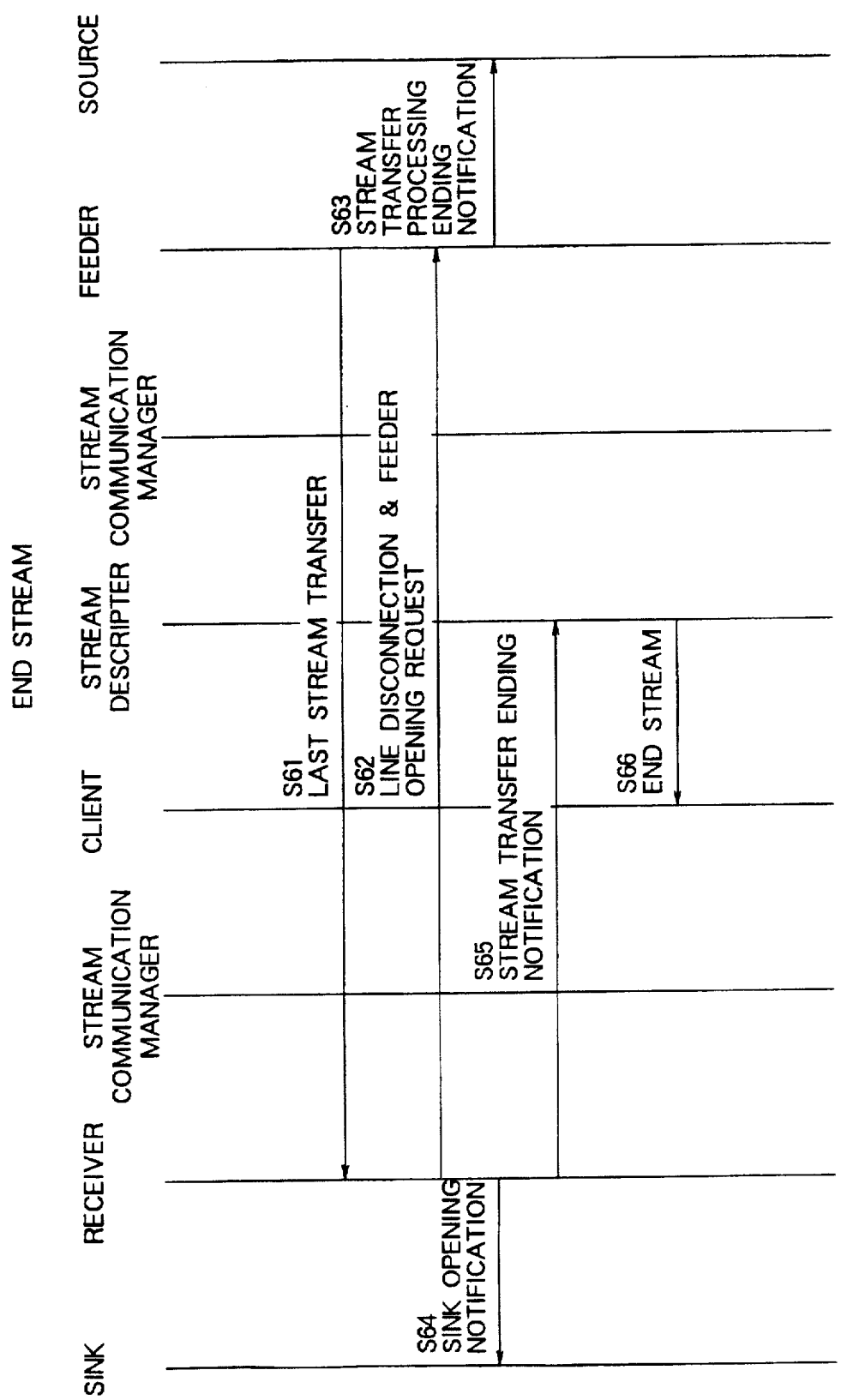
FIG. 11 is a view explaining the operations of the modules when the transfer of the stream is ended in the data processing system shown in FIG. 1.
Figure 12:
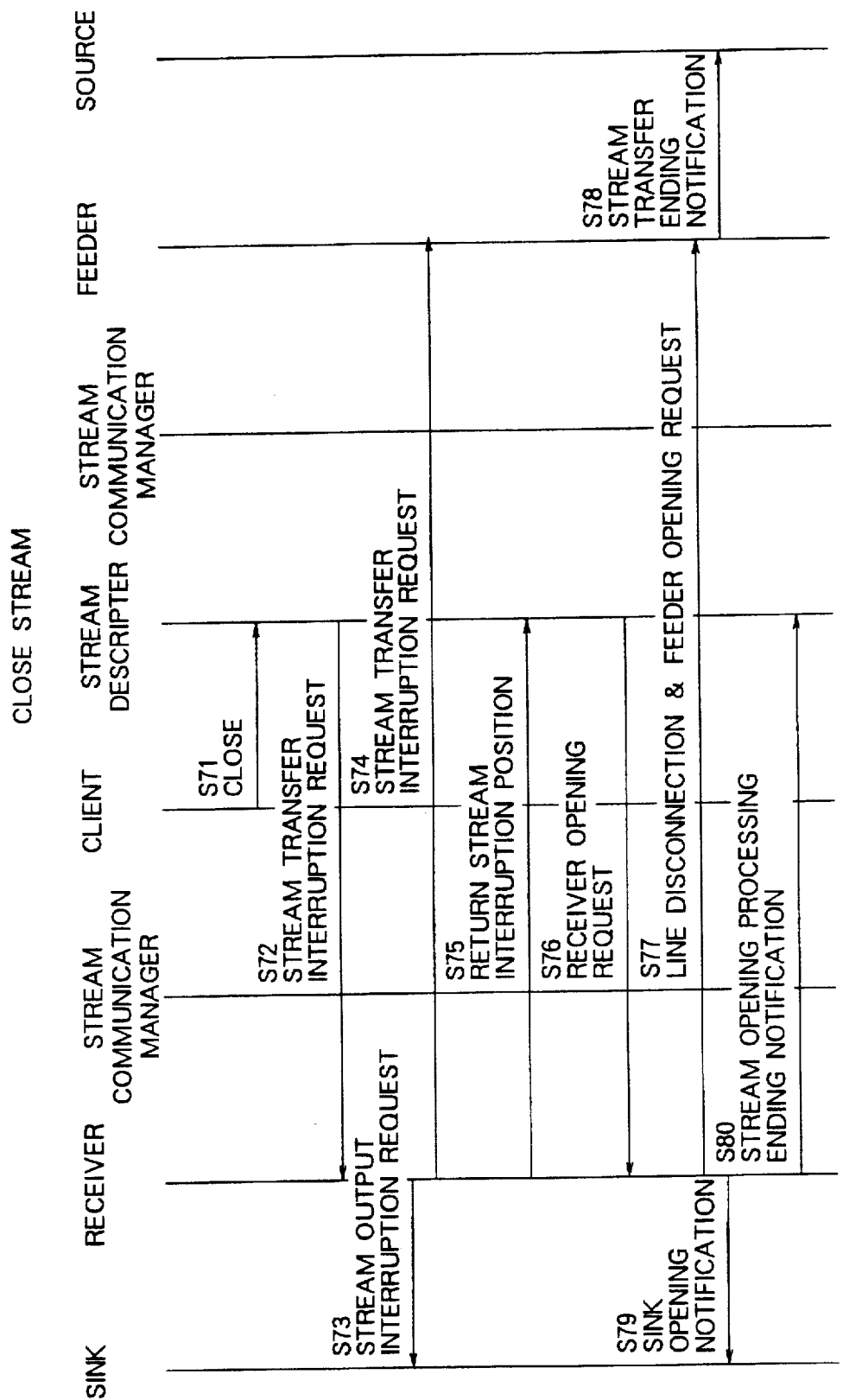
FIG. 12 is a view explaining the operations of the modules when the virtual stream object is closed in the data processing system shown in FIG. 1.

Next, an explanation will be made of the operation to restart the transfer when the communication protocol is not XTP and the stream descriptor module 31 clearly performs the control by referring to FIG. 10.

First, the client application 11 calls up a method "restart" (step S51), whereby the stream descriptor module 31 sends the interruption position at the pause to the feeder module 32 of the data processing apparatus 20 as a parameter and requests the transfer of the stream (step S52). By this, the feeder module 32 reads the stream from the source feeding module 21 and restarts the transfer to the receiver module 33 (step S53). The stream received at the receiver module 33 is successively output to the sink module 12 (step S54).

Note that, the case of use of the XTP protocol where the control signal can be directly sent between the feeder module 32 and the receiver module 33 and the case of non-use of the same were explained separate from each other only when explaining the operation for restarting the transfer, but the same holds true also for the time of a pause operation mentioned before and for the time of an operation for stopping the transfer mentioned later and closing the stream transfer mechanism. Where the XTP is not used, the control thereof is carried out via the stream descriptor module 31.

Next, an explanation will be made of the operation for stopping the transfer of a stream by referring to FIG. 9. In the feeder module 32 of the data processing apparatus 20, when the transfer of the final stream is ended (step S61), the receiver module 33 of the data processing apparatus 10 detects this last stream data and requests the disconnection of the line and the opening of the feeder module 32 to the feeder module 32 (step S62). By this, the feeder module 32 notifies the stopping of the transfer processing of the stream to the source feeding module 21 and the feeder module 32 becomes free in state (step S63). Further, the receiver module 33 notifies the stopping of transfer and opening of the source feeding module 21 to the source feeding module 21 (step S64). Then, the receiver module 33 stops the transfer of the stream to the stream descriptor module 31 (step S65), and the stream descriptor module 31 returns an end stream instruction to the client application 11 (step S66).

Finally, an explanation will be made of the processing for closing the stream transfer mechanism by referring to FIG. 10. Note that, here, an explanation will be made of a case where the stream transfer mechanism is closed during the stream transfer.

When the client application 11 requests a method "close" to the stream descriptor module 31 (step S71), the stream descriptor module 31 requests interruption of the transfer of the stream to the receiver module 33 (step S72). Then, the receiver module 33 first stops the output of the stream to the sink module 12 (step S73) and further requests the interruption of transfer of the stream to the feeder module 32 of the data processing apparatus 20 (step S74) and then returns the data of the interruption position of the stream to the stream descriptor module 31 (step S75).

Next, when the stream descriptor module 31 requests the opening of the receiver module 33 (step S76), the receiver module 33 of the data processing apparatus 10 requests the disconnection of the line and the opening of the feeder module 32 to the feeder module 32 (step S77). By this, the feeder module 32 notifies the ending of the processing for transfer of the stream to the source feeding module 21, and the feeder module 32 becomes free in state (step S78). Further, the receiver module 33 requests the ending of the transfer and the opening of the sink module 12 to the sink module 12 (step S79). Then, the receiver module 33 notifies that the processing for opening of the virtual stream object 30 is ended to the stream descriptor module 31 (step S80).

In this way, in the data processing system of the present embodiment, when the processing is carried out on continuous data such as audio data and video data, it is not necessary to perform troublesome control with respect to it at the application level, therefore the handling of such stream data becomes easy.

Particularly where such stream data must be transferred from the network by telecommunications, conventionally processing such as the generation of the transmission module and the reception module, the connection of them, the sending, stopping, and resending of the stream, etc. must each be carried out, but in the data processing system of the present embodiment, none of this detailed control has to be carried out.

Accordingly, the development of the application modules for handling such stream data becomes easy.

Note that, the present invention is not limited to the present embodiment and that various modifications are possible.

For example, the relationship between the side for feeding the stream data and the side utilizing the stream data may be any relationship so far as the data can be transferred. The distance between them, the type of the network, the type of the mounted processing devices, etc. are all irrelevant.

Further, while the present embodiment was explained with reference only to processing with respect to one stream of data in one virtual stream object, it is also possible to adopt a configuration of a virtual stream object where a plurality of streams of data can be handled in parallel or simultaneously.

Further, it is also possible to provide a more sophisticated processing function than the transfer of the stream data to the virtual stream object. For example, it is possible to give not only the functions of for example reverse playback, jog shuttling, and fast forward, but also a simple image processing function enabling any filter to be applied to transferred video data.

Further, it is also possible to give a function whereby a plurality of streams received from a plurality of information sources are synthesized and used in the virtual stream object 30.

As the format of the data processing system where such streams are synthesized, various formats can be considered. An example thereof will be shown in FIG. 13A and FIG. 13B.

. For example, where two sources stored in one data processing apparatus 20 are synthesized, as shown in FIG. 13A, it is sufficient so far as one virtual stream object 30 is generated in the same way as the present embodiment, a stream synthesizing unit 50 is provided on the feeder module 32 side thereof, and the source data read from two source feeding modules 21a and 21b are synthesized to obtain one stream which is then transferred to the receiver module 33.

Figure 13A:
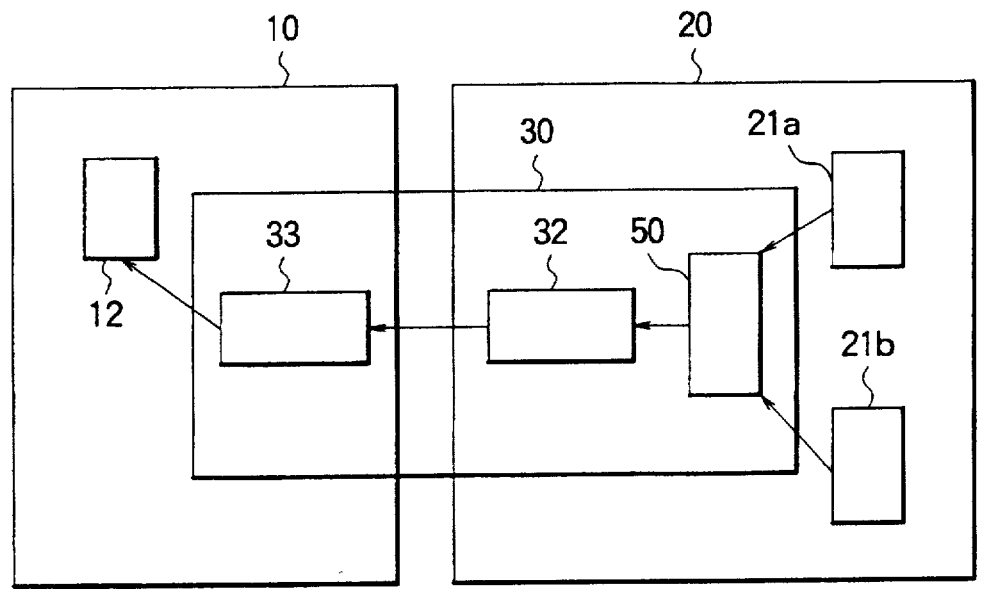
FIG. 13A is a view explaining the data processing method where the stream is synthesized by the data processing system of the present invention and particularly a view of the processing for synthesizing two sources stored in one data processing apparatus.
Figure 13B:
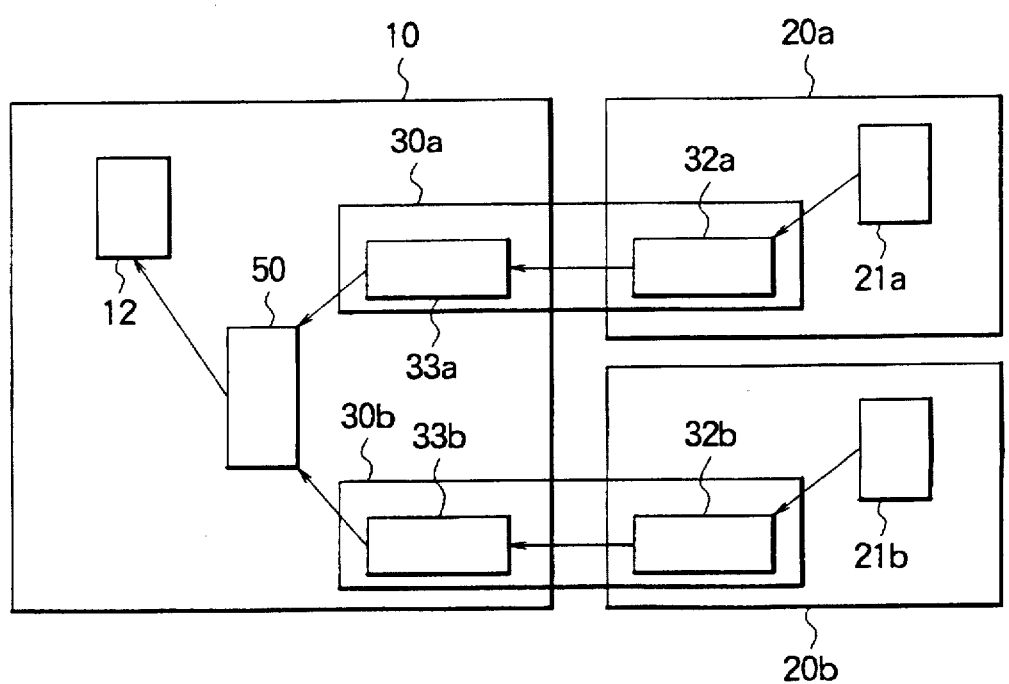
FIG. 13B is a view explaining the data processing method where the stream is synthesized by the data processing system of the present invention and particularly a view of the processing of synthesizing two sources stored in two data processing apparatuses by two virtual stream objects.

Further, where two sources stored in two data processing apparatuses 20a and 20b are synthesized, as shown in FIG. 13B, two virtual stream objects 30a and 30b are generated, feeder modules 32a and 32b are generated in the data processing apparatuses 20a and 20b having sources covered by the synthesis, and the source data read from the source feeding modules 21a and 21b are transferred by these two virtual stream objects 30a and 30b, respectively. Then, on the receiver module 33 side, those two streams are synthesized by the stream synthesizing unit 50 and output to the sink module 12.

Note that, in FIG. 13B, for explanation, the stream synthesizing unit 50 is constituted as a separate module from the virtual stream objects 30a and 30b, but in actuality this stream synthesizing unit 50 is one of the modules of stream synthesis contained in the virtual stream objects 30a and 30b.

Further, the configuration of the stream synthesizing unit 50 used in FIG. 13A and FIG. 13B will be illustrated in FIG. 14.

The stream synthesizing unit 50 is constituted by two timing buffers 51a and 51b corresponding to input two streams, two weighting multipliers 52a and 52b, and a stream adder 53.

In the stream synthesizing unit 50, synchronization of the input first and second data streams is established in the timing buffers 51a and 51b. For example, when the input data streams are video data, frame synchronization is established in the timing buffers 51a and 51b. Then, in the weighting multipliers 52a and 52b, the multiplication is carried out by predetermined weights set by not illustrated control signals, the two weighted streams are added at the stream adder 53, and the resultant one output stream is synthesized.

Note that, where the data processing as shown in FIG. 13A and FIG. 13B is carried out, the contents of the content script 40 are appropriately changed.

Where this additional function is processing that is, used by using a module of the system level, for example depending upon the hardware or when it is complex processing, by adding such a function to the virtual stream object, it becomes easy to perform these processings and therefore it is further effective.

Even if such a function is added, the interface with the application can handle it by just increasing the definitions of the method functions.

The explanation about the cases where a plurality of streams are processed explained above by referring to FIG. 13A, FIG. 13B, and FIG. 14 will be made more concrete by referring to FIG. 15A, FIG. 15B, FIG. 16, and FIG. 17

Figure 15A:
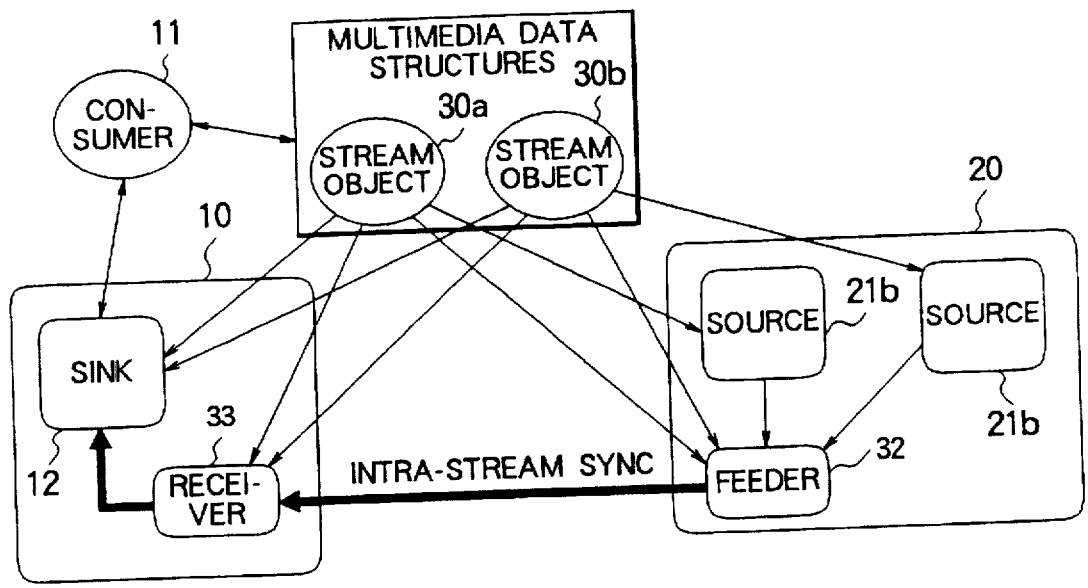
FIG. 15A and FIG. 15B are views of the configuration of the data processing system where a plurality of streams are synthesized and transmitted as one stream for the system shown in FIG. 13A.
Figure 15B:
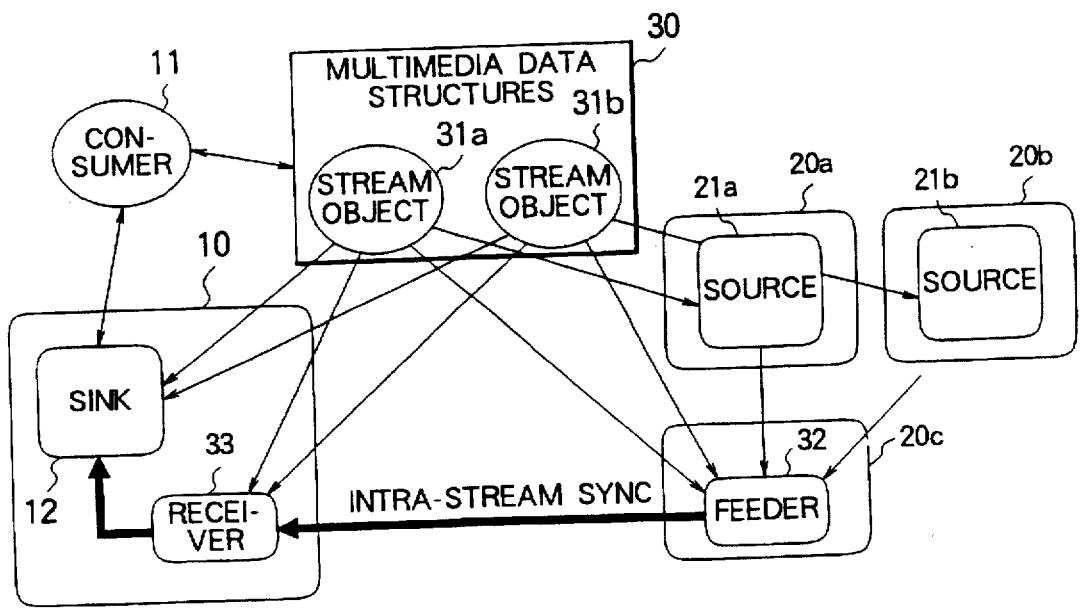

FIG. 15A and FIG. 15B are views of the configuration of the data processing system where a plurality of streams are synthesized and transmitted as one stream corresponding to the example explained above by referring to FIG. 13A.

FIG. 15A is a view of the configuration of the data processing system in which two source feeding modules 21a, 21b and the feeder module 32 are generated on one data processing apparatus 20.

FIG. 15B is a view of the configuration of the data processing system in which two source feeding modules 21a, 21b and the feeder module 32 are generated on different three data processing apparatuses 20a, 20b, 20c.

Figure 16:
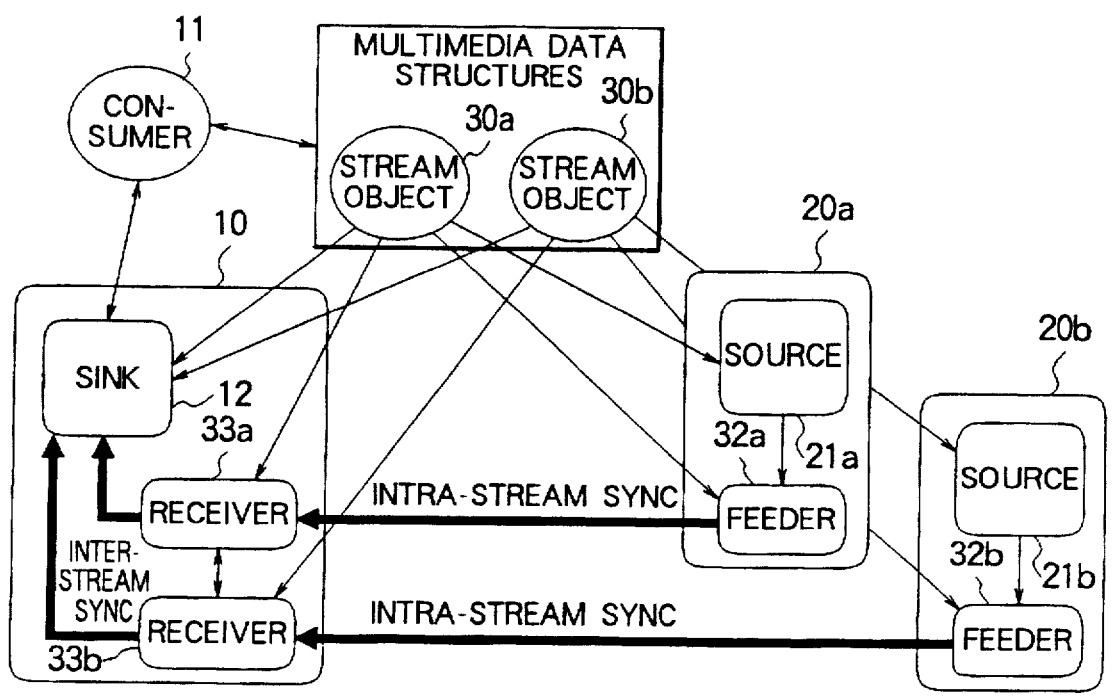
FIG. 16 is a view of the configuration of the data processing system where a plurality of streams are transmitted and synthesized for the system shown in FIG. 13B.

FIG. 16 is a view of the configuration of the data processing system in which a plurality of streams are transmitted each other and then synthesized corresponding to the example explained before by referring to FIG. 13B.

Figure 17:
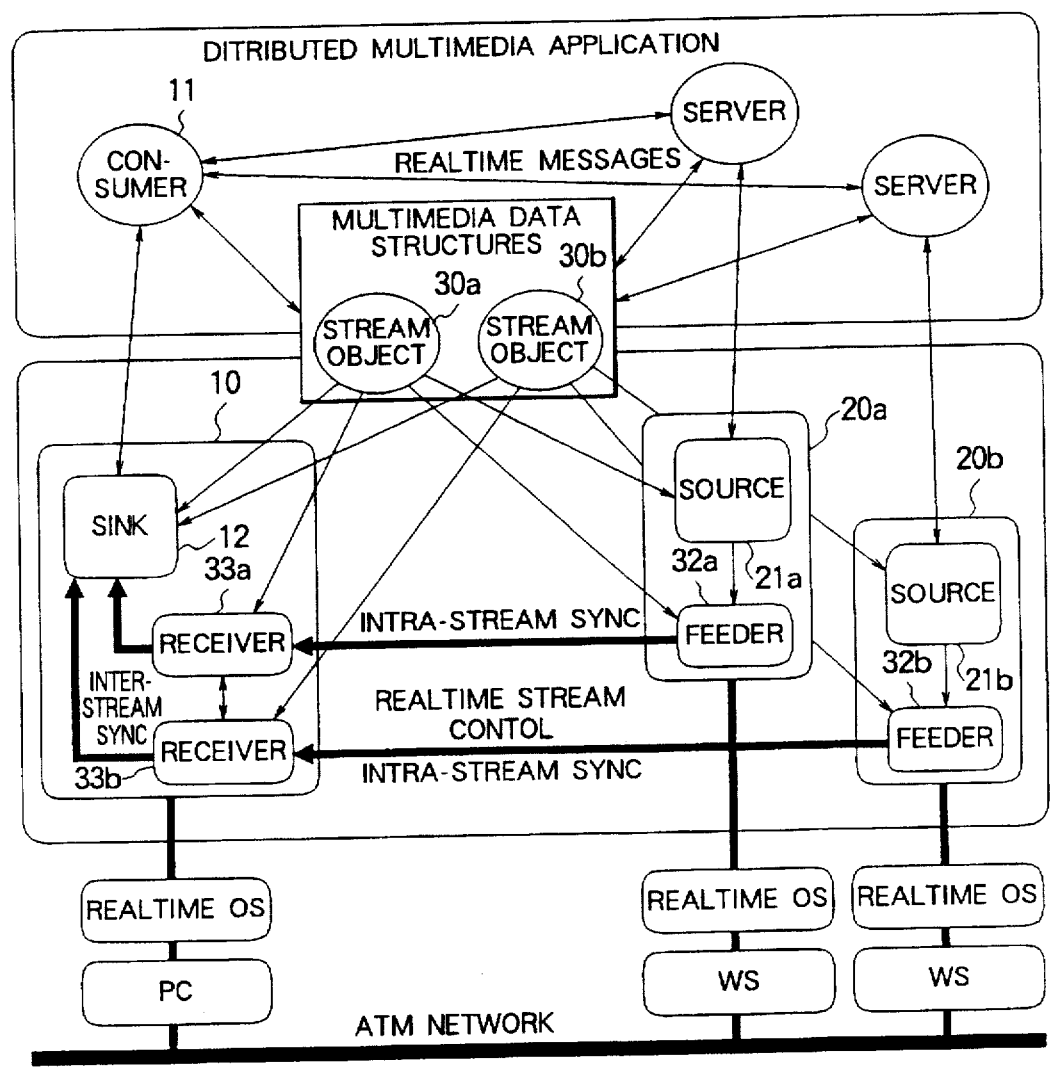
FIG. 17 is a view explaining the data processing system shown in FIG. 16 actually realized in the distributed processing system.

Further, FIG. 17 is a view explaining the system shown in FIG. 16 applied actually on the distributed processing system.

In the example shown in FIG. 16 and FIG. 17, two receiver modules 33a, 33b are synchronized directly and substantially process two streams. As seen from a communication control view, it is preferable that the receiver carry out the control of the data transmission including the control of the feeder. This is why the function of the synthesizing unit 50 comprising timing buffer 51a, 51b is assigned to the receiver module 33 and the system shown in FIG. 16 is constructed. When a system is actually constructed in the distributed processing environment, the configuration of the system may become like these shown in FIG. 15A to FIG. 17. But it is sure that the systems shown in FIG. 15A to FIG. 17 are substantially the same with the system shown in FIG. 13A and FIG. 13B.

As explained above, according to the data processing system of the present invention and the method of the same, an application programming interface for handling the stream processing function referred to as a virtual stream object is provided, therefore the complexity and troublesomeness of the processing when handling continuous data such as audio data and video data can be avoided and sophisticated multimedia processing via a network can be carried out.

What is claimed is:

1. A data processing system for carrying out a desired processing with respect to time series continuous data, comprising:

a first data processing means for providing said time series continuous data which is covered by said processing as a data stream having the predetermined processable format and a second data processing means for carrying out said desired processing with respect to the data stream provided from said first data processing means, said each means being constituted on any of a plurality of nodes connected by networks, and said first data processing means comprising:

a data providing means having said time series continuous data which is covered by the processing and for providing the data in accordance with a request;

a delivering means for delivering said provided time series continuous data; and a managing means for managing said data providing means and said delivering means so as to obtain said time series continuous data to be subjected to desired processing based on a request from said second data processing means and substantially providing said received and obtained time series continuous data to said second data processing means.

2. A data processing system as set forth in claim 1, wherein said data stream generated from said second data processing means is defined by the data which identifies said time series continuous data and the data which identifies said second processing means for carrying out the desired processing with respect to the data stream.

3. A data processing system as set forth in claim 2, wherein said delivering means has a transmitting means for obtaining said time series continuous data from said data providing means and transmitting the same and a receiving means for receiving said transmitted data, said managing means manages said each said means so as to obtain said time series continuous data to be subjected to desired processing based on a request from said second data processing means and substantially provides said received and obtained time series continuous data to said second data processing means.

4. A data processing system as set forth in claim 3, wherein said managing means generates said transmitting means on a node at which said data providing means having the time series continuous data is to be subjected to the desired processing based on a request from said second data processing means, generates said receiving means on a node at which said second data processing means exists, and transfers the time series continuous data to said second data processing means via said transmitting means and said receiving means.

5. A data processing system as set forth in claim 4, wherein said managing means is constituted on any node on said networks.

6. A data processing system as set forth in claim 5, wherein said time series continuous data Is AV data having either of video data or audio data or both of the same.

7. A data processing system as set forth in claim 5, further comprising a data restoring means for restoring the data converted to the predetermined format to the original time series continuous data, wherein said transmitting means transmits said time series continuous data by the predetermined data transfer format, said receiving means receives said data transferred by said predetermined format, said restoring means restores said transferred data to the original time series continuous data, and said managing means substantially provides said restored time series continuous data to said second data processing means.

8. A data processing system as set forth in claim 5, wherein said first data processing means comprises a plurality of said data providing means, said delivering means for synthesizing a plurality of said time series continuous data provided from said plurality of data providing means to generate one time series continuous data and delivering the data, and said managing means for managing said plurality of data providing means and said delivering means so as to obtain the desired time series continuous data based on a request from said second data processing means and providing said received and obtained time series continuous data to said second data processing means.

9. A data processing system as set forth in claim 8, wherein said delivering means comprises a synthesizing means for synthesizing a plurality of time series continuous data provided from said plurality of data providing means, said transmitting means for transmitting said synthesized time series continuous data, and said receiving means for receiving said transmitted data.

10. A data processing system as set forth in claim 8, wherein said delivering means comprises a plurality of said transmitting means for respectively obtaining the time series continuous data from said plurality of data providing means and transmitting the same, a plurality of receiving means for respectively receiving the data transmitted from said plurality of transmitting means, and a synthesizing means for synthesizing said plurality of time series continuous data received at said plurality of receiving means.

11. A data processing method for enabling a data processing means constituted on any of at least one of a plurality of nodes on a network in which a plurality of nodes are connected to perform a desired processing with respect to time series continuous data existing on any node, comprising the steps of generating a managing means for managing said time series continuous data on any node on said network in accordance with a request from said data processing means, generating a transmitting means for obtaining said time series continuous data and transmitting the same with a predetermined transfer format on the node having said time series continuous data by said managing means, generating a receiving means for receiving the data transmitted with said predetermined format on a node for performing said desired processing with respect to said time series continuous data by said managing means, transferring the desired data of said time series continuous data in accordance with a request for provision of a desired position and desired format of said time series continuous data from said data processing means via said transmitting means and said receiving means under the control of said managing means, restoring the transferred data to generate the original time series continuous data and providing the same to said data processing means, and performing said desired processing with respect to said provided time series continuous data by said data processing means.

12. A data processing method for enabling a data processing means constituted on any of at least one of a plurality of nodes on a network in which a plurality of nodes are connected to perform a desired processing with respect to time series continuous data existing on any node, comprising the steps of generating a managing means for managing said time series continuous data to be processed on any node on said network in accordance with a request from said data processing means, performing processing for synthesizing said plurality of time series continuous data in accordance with the request for provision of a desired position and desired format of said plurality of time series continuous data from said data processing means based on the control of said managing means on the node having said time series continuous data, transferring said synthesized data onto the node for performing said desired processing based on the control of said managing means, restoring said transferred data to generate the time series continuous data and providing the same to said data processing means, and performing said desired processing with respect to said provided time series continuous data by said data processing means.

13. A data processing method for enabling a data processing means constituted on any of at least one of a plurality of nodes on a network in which a plurality of nodes are connected to perform a desired processing with respect to time series continuous data existing on any node, comprising the steps of generating a managing means for managing said time series continuous data to be processed on any node on said network in accordance with a request from said data processing means, generating transmitting means for obtaining the time series continuous data and transmitting the same with a predetermined transfer format on the nodes having said plurality of series of time series continuous data by said managing means, generating a plurality of receiving means for receiving the transmitted data with said predetermined format on the node for performing the desired processing by said data processing means by said managing means, transferring the desired data of said time series continuous data in accordance with a request for provision of a desired position and desired format of said time series continuous data from said data processing means via said transmitting means and said receiving means under the control of said managing means, applying the synthesizing processing to said transferred plurality of series of time series continuous data under the control of said managing means, restoring said synthesized data to generate the time series continuous data and providing the same to said data processing means, and performing said desired processing by said data processing means with respect to said provided time series continuous data.

* * * * *